United States Patent [19]

Ishii et al.

[11] 4,105,086
[45] Aug. 8, 1978

[54] SYSTEM FOR CONTROLLING VEHICULAR FOUR-WHEEL STEERING MECHANISMS

[76] Inventors: Takemochi Ishii, No.3-11-12, Kugayama, Suginami-ku, Tokyo; Masakazu Iguchi, No.8-1-1, Nishishinjuku, Shinjuku-ku, Tokyo; Masaki Koshi, No.1-1-26-524, Nakameguro, Meguro-ku, Tokyo, all of Japan

[21] Appl. No.: 740,882

[22] Filed: Nov. 11, 1976

[30] Foreign Application Priority Data

Nov. 13, 1975 [JP] Japan .................................. 50-136687

[51] Int. Cl.² ............................................. B62D 7/00
[52] U.S. Cl. .................................. 180/79; 104/244.1; 180/143; 280/91
[58] Field of Search ...................... 180/105 R, 79, 131, 180/143; 104/245, 242, 244.1, 247; 280/91

[56] References Cited

U.S. PATENT DOCUMENTS

| 3,596,730 | 8/1971 | Cecce | 280/91 X |
| 3,796,165 | 3/1974 | Goode | 180/131 X |
| 3,822,648 | 7/1974 | Ishii et al. | 104/245 |
| 3,882,954 | 5/1975 | Inoue | 180/143 |

Primary Examiner—Kenneth H. Betts
Attorney, Agent, or Firm—Lane, Aitken, Dunner & Ziems

[57] ABSTRACT

A system for controlling vehicular four-wheel steering mechanisms, having means for varying the ratio of the steering angle of the rear wheels to that of the front wheels as a function of the vehicle speed to effect four-wheel steering in low-speed operations and substantially only front steering in high-speed operations of the vehicle.

8 Claims, 6 Drawing Figures

SYSTEM FOR CONTROLLING VEHICULAR FOUR-WHEEL STEERING MECHANISMS

BACKGROUND OF THE INVENTION

This invention relates to a steering control system for vehicular four-wheel steering mechanisms.

Four-wheel steering has an advantage in that vehicles are allowed to make turns of relatively small radii. However, one of the problems inherent to the four-wheel steering is the lowered stability due to sideskidding of the vehicles during highspeed operations.

The present invention has as its object the provision of a steering control system for vehicles with four-wheel steering, which system eliminates the above-mentioned problem while retaining the advantages of the four-wheel steering.

It is a more particular object of the invention to provide a steering control system for vehicles with four-wheel steering, which system is adapted to effect both front and rear steering in low-speed operations of the vehicle and substantially solely front steering in high-speed operations.

SUMMARY OF THE INVENTION

According to the present invention, there is provided a system for controlling four-wheel steering mechanisms for vehicles having a pair of front wheels and a pair of rear wheels, comprising: a steering mechanism operable in response to manual or automatic steering operation to turn the front and rear wheels to angles suitable for directing the vehicle to a steered direction; and control means for varying the ratio to the steering angle of the rear wheels to that of the front wheels as a function of the travelling speed of the vehicle to effect four-wheel steering in low-speed operations and only front steering in high-speed operations of the vehicle.

In one form of the invention, the four-wheel steering mechanism has front and rear steering linkages connected by front and rear connected rods and an intermediate link rotatably mounted on a floor structure of the vehicle and having one end pivotally connected to the front connecting rod and the other end to the rear connecting rod through a control mechanism adapted to vary the distance between the rotational axis of the intermediate link and a point at which the intermediate link is connected to the rear connecting rod.

In one specific form of the invention, the control mechanism includes an arcuate extension provided at the other end of the intermediate link and defining an arc of a circle having a radius substantially equal to the length of the rear connecting rod, a slider slidably mounted on the arcuate extension and pivotally connected to the rear connecting rod, and drive means connected to the slider to control said distance in relation with the vehicle speed by moving the slider on the arcuate extension.

In a more specific form of the invention, the drive means includes a speed sensor, a function generator and a servo motor for driving said slider, the function generator being adapted to receive a speed signal from said sensor and to produce for the servo motor an output signal varying in accordance with said speed signal to move the slider to a position establishing the steering angle ratio varying as a function of the vehicle speed.

It is preferred that the slider be driven by said servo motor through an internally threaded cylindrical member rotated by said servo motor and a screw rod held in meshed engagement with the cylindrical member and having one end thereof connected to the slider.

The above and other objects, features and advantages of the invention will become apparent from the following description and the appended claims, taken in conjunction with the accompanying drawings.

DESCRIPTION OF THE PREFERRED EMBODIMENT

Figure 1:
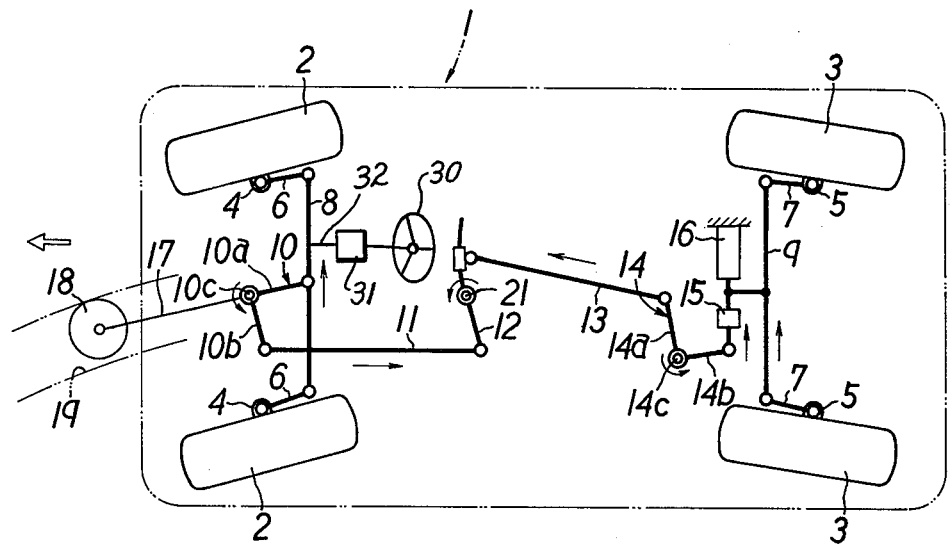
FIG. 1 is a diagrammatic view of a four-wheel steering mechanism incorporating the principles of the control method of the present invention.

Referring to the accompanying drawings and first to FIG. 1, there is diagrammatically shown at 1 a vehicle with a four-wheel steering mechanism incorporating the principles of the present invention. The front and rear steering mechanism can be constituted by combination of known linkages and connecting means. For example, the four-wheel steering mechanism of FIG. 1. has in the usual manner kingpins 4 and 5 for front and rear wheels 2 and 3, the kingpins 4 and 5 being connected to knuckle arms 6 and 7, respectively. The knuckle arms 6 of the front wheels 2 are connected to opposite ends of a tie rod 8, while the knuckle arms 7 of the rear wheels 3 are connected to opposite ends of a tie rod 9. The tie rod 8 is pivotally connected at its middle portion to one arm 10a of an L-link 10 which is pivotally supported at its elbow on the vehicle floor through a support shaft 10c. The other arm 10b of the L-link 10 is connected to one arm 14a of a similar rear L-link 14 through connecting rods 11 and 13, which are connected by an intermediate link 12 which is pivotally supported on a fixed shaft 21. The other arm 14b of the rear L-link 14 is connected to a displacement detector 15 which detects the amount of displacement of the link 14. The detector 15 may be provided in the form of, for example, a follow-up type servo valve which operates a steering cylinder 16 in accordance with the amount of displacement of the rear L-link 14. The detector 15 is connected to a power steering cylinder 16 which is in turn connected to the rear tie rod 9 to steer the rear wheels 3 in response to the detected amount of displacement.

In the embodiment shown in FIG. 1, the front L-link 10 has a guide link 17 formed integrally therewith, the guide link 17 mounting at the fore end thereof a guide wheel 18. The guide wheel 18 is received in and guided along a sunken guide channel 19 formed beneath the surface of a track on which the vehicle 1 travels to steer the vehicle 1 along the track. In this connection, there may be employed a front steering mechanism disclosed in our U.S. Pat. No. 3,822,648, issued on July 9, 1974 and entitled "GUIDING SYSTEM FOR STEERING A VEHICLE". When the guide wheel 18 is swung to the left as shown in FIG. 1, the respective links and connecting rods are moved or turned in the directions indicated by the arrows, thereby steering the front and rear wheels to suitable angles relative to the longitudinal axis of the vehicle. Though the steering mechanism of FIG. 1 is shown as being operated by a guide wheel which is guided by and along a sunken guide channel, the front L-link may be connected to other steering means, such as the usual steering wheel 30 coupled to a steering gear box 31 and connected to the tie rod 8 by the steering arm 32 by a drag link (not shown), if desired.

According to the steering control system of the present invention, the ratio of steering angle of the rear wheels to that of the front wheels is varied as a function of the vehicle speed in a four-wheel steering mechanism as shown in FIG. 1 by way of example. The system controls the steering mechanism to effect both the front and rear steering during low-speed operations of the vehicle where there is less possibility of the four-wheel steering giving adverse effects on the stability of the vehicle and where turns of small radii are often desired. On the other hand, during high-speed operations, when it is difficult to make a turn of a small radius due to an increase in sideward acceleration, the system controls the steering mechanism to steer only the front wheels. At the intermediate speeds, the ratio of the steering angle of the rear wheels to that of the front wheels is varied in relation to the vehicle speed as mentioned hereinbefore.

Figure 2:
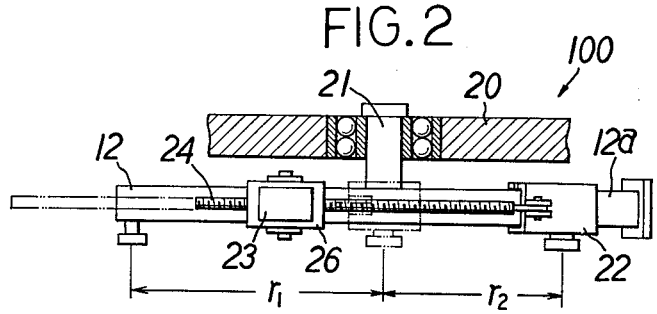
FIG. 2 is a diagrammatic section showing an intermediate link and associated parts.
Figure 3:
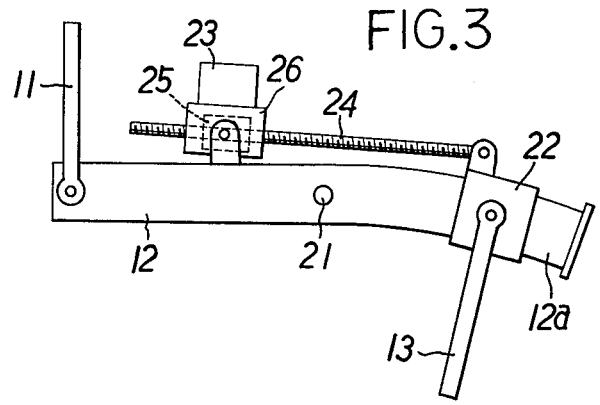
FIG. 3 is a diagrammatic view showing certain members employed to put into practice the method of the invention.

FIGS. 2 and 3 shows an example of the steering control system 100 which operates to vary the ratio of the steering angle of the rear wheels to that of the front wheels according to the present invention. As mentioned hereinbefore, the intermediate link 12 of the steering mechanism of FIG. 1 is rotatably mounted on a support shaft 21 which is fixedly mounted on the vehicle floor 20, and has one end thereof pivotally connected to the connecting rod 11 from the front wheels 2. At the other end, the intermediate link 12 has an arcuate extension 12a extending along an arc of a circle having a radius substantially equivalent to the length of the connecting rod 13 leading to the rear wheels. One end of the just-mentioned connecting rod 13 is pivotally connected to a slider 22 which is slidably mounted on the arcuate extension 12a of the intermediate link 12. The slider 22 is connected to a screw shaft 24 which is driven in the axial direction from a servo motor 23 through an internally threaded cylinder or nut 25 which is in threaded engagement with the screw shaft 24. The internally threaded cylinder 25 is rotatably accommodated in a casing 26 which is pivotally mounted on the intermediate link 12 to adapt to the slanting of the screw shaft 24 caused by the movement of the slider 22 along the arcuate extension 12a.

Upon movement of the slider 22 along the arcuate extension 12a by operation of the servo motor 23, the ratio of the distance $r_1$ (from the rotational axis of the link 12 to the pivoting point of the connecting rod 11) to the distance $r_2$ (from the rotational axis of the link 12 to the pivoting point of the connecting rod 13) is varied. As a result, the steering angle of the rear wheels 3 is varied relative to that of the front wheels 2. For example, when the slider 22 is at the position indicated by a broken line ($r_2 = 0$) in FIG. 2, the steering angle of the rear wheels 3 is substantially zero irrespective of the steering angle of the front wheels.

Figure 4:
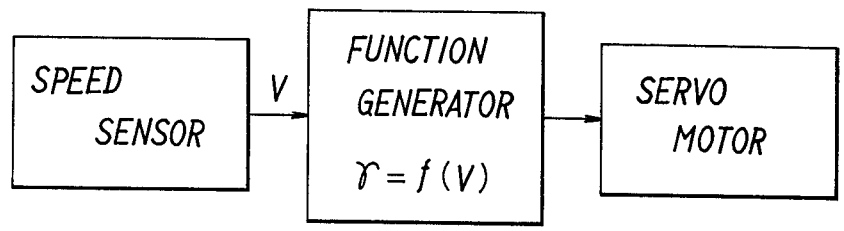
FIG. 4 is a block diagram of certain control units.

The variation of the steering angle ratio or the variation in the ratio of $r_2:r_1$ in relation to the vehicle speed is effected, for example, by employing a speed sensor, a function generator and a servo motor as shown in FIG. 4. In this instance, the speed signal from the speed sensor is fed to the function generator which produces an output signal as modulated in response to the travel speed of the vehicle to drive the servo motor 23 in a manner related to the vehicle speed.

It is preferred to provide a restoration means, such as spring, which acts on the slider 22 to restore the $r_1 = r_2$ conditions in abnormal cases.

Figure 5:
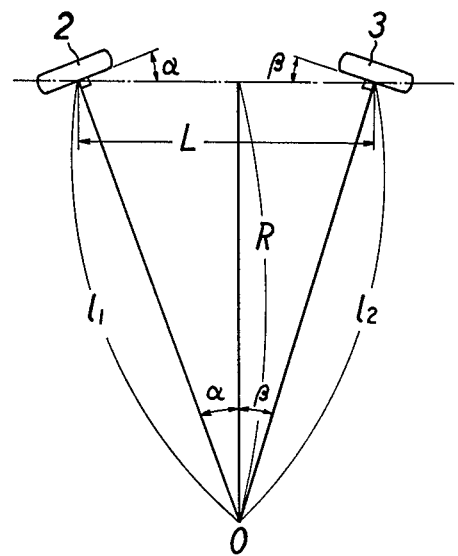
FIG. 5 is a diagrammatic view employed for the convenience of explanation of the variations in the steering angle.

FIG. 5 shows the manner of varying the ratio of rear to front steering angle in relation to the vehicle speed. As a matter of fact, there is a difference in steering angle between the right and left wheels, for example, as in the Ackermann's steering mechanism. However, it is not a matter of importance and thus the following discussion uses mean steering angles, $\alpha$ for front wheels and $\beta$ for rear wheels.

The front and rear steering angles $\alpha$ and $\beta$ are varied to satisfy $$\beta = \gamma \cdot \alpha \tag{1}$$

where the coefficient $\gamma (0 \leq \gamma \leq 1)$ is varied as a function of the vehicle speed V, or $$\gamma f(V) \tag{2}$$

The maximum allowable lateral acceleration of the vehicle has to be $$V^2/R \leq a \tag{3}$$

where $a$ is a maximum allowable lateral acceleration and $R$ is a radius of turn of the vehicle. Under these circumstances, if it is desired to turn the vehicle at a high speed, the radius of turn $R$ has to be increased in proportion to $V^2$ under the conditions dictated by formula (3). If the coefficient $\gamma$ is reduced to a value sufficiently below 1, the locus of the rear wheel comes inward of that of the front wheel in a case where no sideskidding occurs. However, the inward deviation from the locus of the front wheel should not exceed a certain limit $d$. Based on approximations of $\alpha$ and $\beta$ being sufficiently small, the amount of the inward deviation is given by $$\iota_1 - \iota_2 \approx (R/2) \alpha^2 (1 - \gamma^2) \leq d \tag{4}$$

and the geometrical relation of the front and rear wheels shown in FIG. 5 is expressed by $$R(\alpha + \beta) \approx L \tag{5}$$

where $L$ is the wheel base or the distance between the front and rear wheel spindles. By substituting formulas (1) and (3) in formula (5), we have $$\alpha \leq \frac{L}{1+\gamma} \frac{a}{V^2} \tag{6}$$

Figure 6:
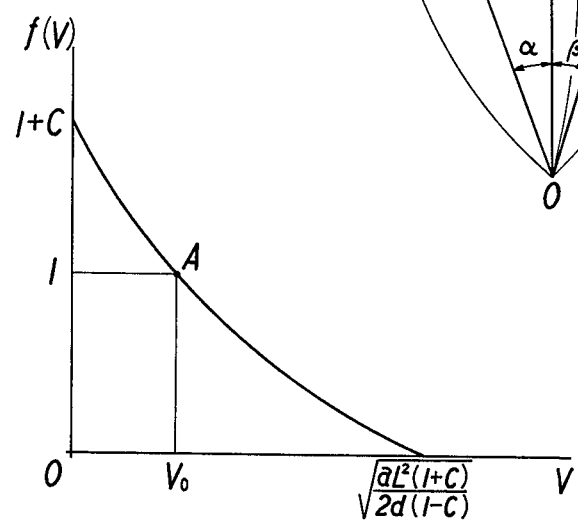
FIG. 6 is a graphic representation of the relation between the vehicle speed and the steering angle.

By substituting formulas (3) and (6) in formula (4), we have $$\gamma \geq \frac{aL^2 - 2dV^2}{aL^2 + 2dV^2} \quad (7)$$

where $\gamma$ is of course under the restriction of $0 \leq \gamma \leq 1$. Thus, using a constant C, we have $$f(V) = \frac{aL^2 - 2dV^2}{aL^2 + 2dV^2} + C \quad (8)$$

and, as the point A in the graph of FIG. 6 is of the smallest turn radius for the vehicle speed $Vo$ and $\gamma=1$ $$C = \frac{4dVo^2}{aL^2 + 2dVo^2} \quad (9)$$

and thus $$f(V) = \frac{2L^2 - 2dV^2}{2L^2 + 2dV^2} + \frac{4dVo^2}{2L^2 + 2dVo^2} \quad (10)$$

Therefore, the value of should be: $\gamma=1$ when $V<Vo$ and $f(V)>1$; $\gamma=f(V)$ when $V \geq Vo$ and $0 \leq f(V) \leq 1$; and $\gamma=0$ when $$V \geq \sqrt{\frac{aL^2(1+C)}{2d(1-C)}}$$

and $f(V)<0$, speaking idealistically. The function generator thus gives the servo motor 23 output signals modulated according to the value of $\gamma$ which has been obtained on the basis of the vehicle speed V in the manner described above, thereby to vary the steering angle $\beta$ of the rear wheels.

However, the value of $\gamma$ is not necessarily required to be calculated strictly according to the formulas given above and a value having a similar tendency will also be effective.

It will be appreciated from the foregoing description that, with the steering control system of the invention, it becomes possible to effect the four-wheel steering only in low-speed operations, while restricting the steering to the front wheels in high-speed operations to ensure improved stability of the vehicle.

What is claimed is:

1. A system for controlling four-wheel steering mechanisms for vehicles having a pair of front wheels and a pair of rear wheels, comprising:
    a steering mechanism operable in response to a steering operation to turn the front and rear wheels to angles suitable for directing the vehicle to a steered direction, including front and rear steering linkages operatively connected respectively to the front and rear wheels; and
    control means interconnecting said front and rear steering linkages and responsive to the speed of the vehicle to vary the ratio of the steering angle of the rear wheels to the steering angle of the front wheels as a function of the travelling speed of said vehicle to effect four-wheel steering in low-speed operations, and to vary only front steering in high-speed operations of said vehicle.

2. A system as defined in claim 1, wherein said control means include front and rear connecting rods connected respectively to said front and rear steering linkages, and an intermediate link rotatably mounted on a floor structure of said vehicle, one end of said link connected to said front connecting rod and the other end of said link connected to said rear connecting rod through a control mechanism adapted to vary the distance between the rotational axis of said intermediate link and a point at which said intermediate link is connected to said rear connecting rod.

3. A system as defined in claim 2, wherein said control mechanism includes an arcuate extension provided at said other end of said intermediate link and defining an arc of a circle having a radius substantially equal to the length of said rear connecting rod, a slider slidably mounted on said arcuate extension and connected to said rear connecting rod, and drive means connected to said slider to control said distance in relation to the vehicle speed by moving said slider on said arcuate extension.

4. A system as defined in claim 3, wherein said drive means includes a speed sensor, a function generator and a servo motor for driving said slider, said function generator being adapted to receive a speed signal from said sensor and to produce for said servo motor an output signal varying in accordance with said speed signal to move said slider to a position establishing said steering angle ratio varying as a function of the vehicle speed.

5. A system as defined in claim 4, wherein said slider is driven from said servo motor through an internally threaded cylindrical member rotated by said servo motor and a screw rod held in meshed engagement with said cylindrical member and having one end thereof connected to said slider.

6. A system as defined in claim 1, wherein said four-wheel steering mechanism is operated by manual steering means.

7. A system as defined in claim 1, wherein said four-wheel steering mechanism is operated by automatic steering means.

8. A system as defined in claim 7, wherein said automatic steering means includes a sunken guide channel provided beneath the surface of a track on which said vehicle travels and a guide link connected to said front steering linkage and mounting at the fore end thereof a guide wheel running in and along said sunken guide channel.

* * * * *